US009396597B2

(12) United States Patent
Yamane et al.

(10) Patent No.: US 9,396,597 B2
(45) Date of Patent: Jul. 19, 2016

(54) SMART ENTRY SYSTEM

(71) Applicant: Honda Motor Co., Ltd., Tokyo (JP)

(72) Inventors: Katsuyasu Yamane, Wako (JP); Shinichi Arie, Wako (JP); Masayuki Yamazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 24 days.

(21) Appl. No.: 14/475,723

(22) Filed: Sep. 3, 2014

(65) Prior Publication Data
US 2015/0061830 A1 Mar. 5, 2015

(30) Foreign Application Priority Data

Sep. 5, 2013 (JP) .................. 2013-184229

(51) Int. Cl.
*G05B 19/00* (2006.01)
*G07C 9/00* (2006.01)
*B60R 25/24* (2013.01)

(52) U.S. Cl.
CPC .......... *G07C 9/00111* (2013.01); *B60R 25/245* (2013.01); *G07C 9/00182* (2013.01); *G07C 9/00309* (2013.01); *G07C 2009/00198* (2013.01); *G07C 2009/00793* (2013.01); *G07C 2209/63* (2013.01)

(58) Field of Classification Search
CPC .................. B60R 25/245; G07C 2009/00198; G07C 2209/63
See application file for complete search history.

(56) References Cited

U.S. PATENT DOCUMENTS

| 2002/0024427 | A1* | 2/2002 | Banas | B60R 25/246 340/425.5 |
| 2004/0183654 | A1* | 9/2004 | Brillon | B60R 25/24 340/5.72 |
| 2006/0077042 | A1* | 4/2006 | Hock | B60R 25/24 340/10.4 |
| 2009/0243796 | A1* | 10/2009 | Tieman | B60R 25/24 340/5.72 |
| 2015/0248801 | A1* | 9/2015 | Froitzheim | B60R 25/245 340/5.61 |

FOREIGN PATENT DOCUMENTS

| JP | 2007-146440 | 6/2007 |
| JP | 2009-0849070 | 4/2009 |
| JP | 2009-532600 | 9/2009 |
| JP | 2012-082654 | 4/2012 |

\* cited by examiner

*Primary Examiner* — Omeed Alizada
(74) *Attorney, Agent, or Firm* — Rankin, Hill & Clark LLP

(57) ABSTRACT

Upon determination that a mobile device is present within a first communication area, a control device maintains transmitter power output of an electromagnetic wave to be transmitted from a communication section. Further, the mobile device decreases sensitivity for receiving the electromagnetic wave such that the first communication area is narrowed to a second communication area. Then, the control device determines, based on presence/absence of a response from the mobile device, whether the mobile device is present within the second communication area.

2 Claims, 3 Drawing Sheets

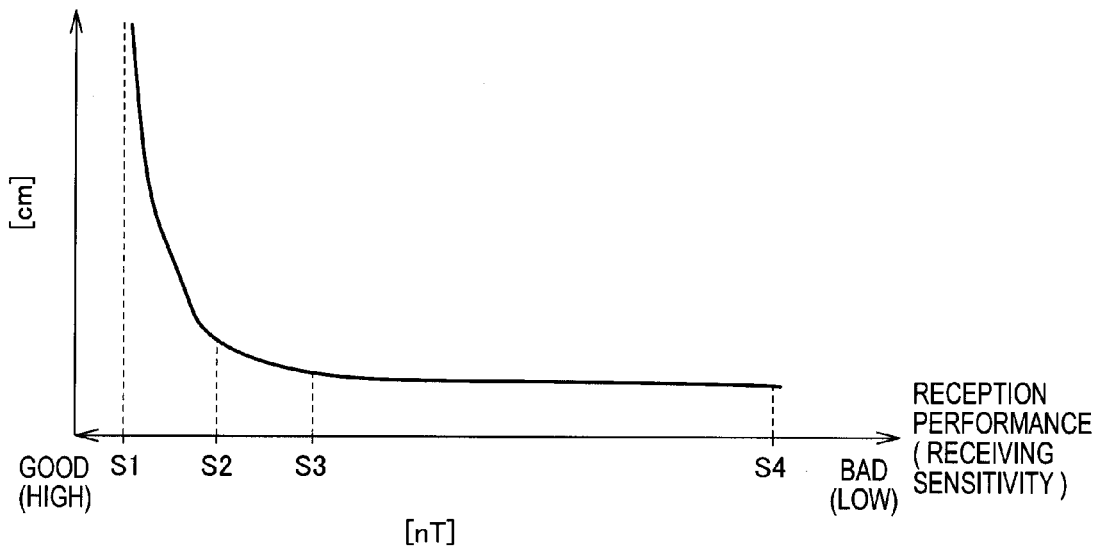
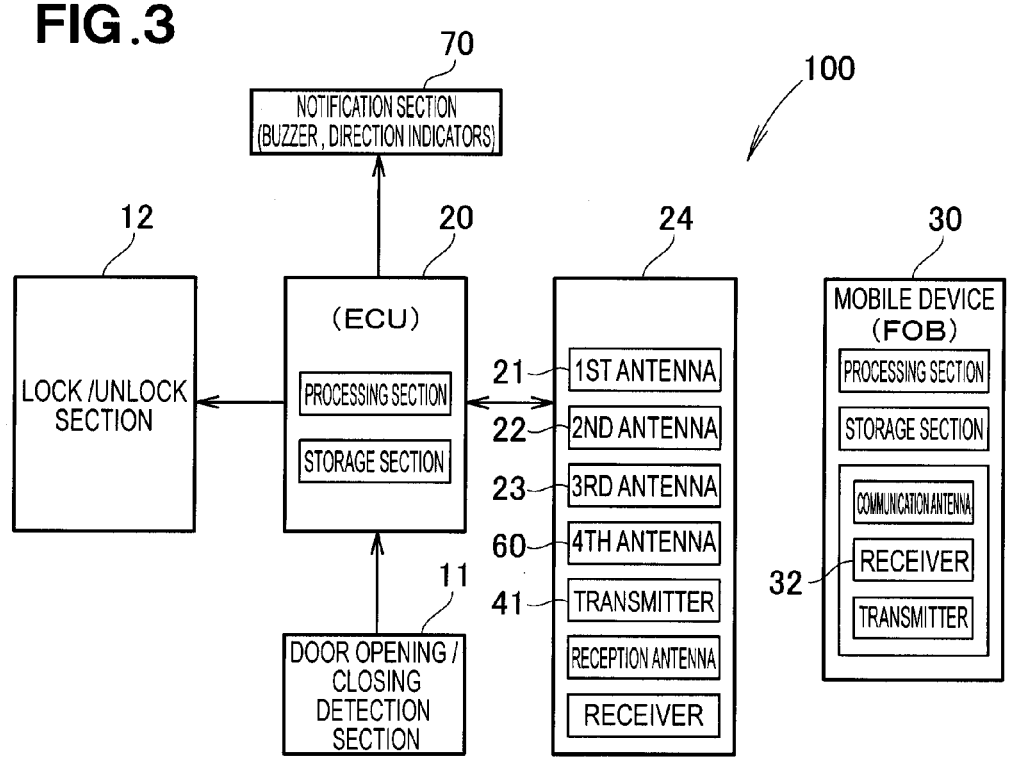

SMART ENTRY SYSTEM

FIELD OF THE INVENTION

The present invention relates generally to an improvement of smart entry systems for vehicles.

BACKGROUND OF THE INVENTION

Japanese Patent Application Laid-Open Publication No. 2009-84907 (hereinafter referred to as "Patent Literature 1"), for example, discloses a smart entry system that generally comprises a mobile device and a keyless control unit, in which the keyless control unit is connected to a door switch. According to the disclosure of Patent Literature 1, upon detection that a vehicle door has been switched from an opened state to a closed state, the keyless control unit sets a communication area of a request signal to a second predetermined area wider than a first predetermined area. After that, when the mobile device is present in the second predetermined area (i.e., wider communication area), the keyless control unit sets the communication area of the request signal to the first predetermined area. Then, when the mobile device is not present in the first predetermined area (i.e., narrower communication area), the keyless control unit locks the vehicle door.

Namely, immediately after a passenger gets out of the vehicle and then closes the vehicle door, the communication area is set to the wider communication area (i.e., second predetermined area); thus, it is possible to avoid the mobile device from getting out of the wider communication area even when the user tries to hurriedly move away from the vehicle after closing the vehicle door. In other words, even when the user tries to hurriedly move away from the vehicle, the vehicle door can be locked reliably.

However, the inventors of the present invention etc. have recognized that the outer peripheral edge of the first predetermined area (narrower communication area) has to be set at a predetermined distance (e.g., two meters (2 m) or below) from the vehicle, and that, with an approach of lowering transmitter power output of the request signal when the second predetermined area is to be narrowed to the first predetermined area as disclosed in Patent Literature 1, accuracy in setting the first predetermined area would undesirably decrease.

That the outer peripheral edge of the communication area should be set, for example, two meters or below from the vehicle is prescribed by the so-called "Thatcham" that is a standard of Association of British Insurers. According to the disclosure of PCT-Japanese Patent Application Laid-Open Publication No. 2009-532600 ("Patent Literature 2"), for example, distances for defining or setting a communication area are set two meters or below.

SUMMARY OF THE INVENTION

It is an object of the present invention to provide an improved smart entry system for a vehicle which can set an extent of a communication area with an increased accuracy. Other objects of the present invention will become apparent to a person skilled in the art with reference to the following illustrative description of preferred embodiments and the accompanying drawings.

According to a first aspect of the present invention, there is provided a smart entry system which detects whether or not a mobile device is present within a first communication area set outside of a vehicle, the smart entry system comprising: a door opening/closing section that detects opening and closing of a door of the vehicle; a communication section that, once a change from an opened state to a closed state of the door is detected by the door opening/closing section, transmits to the outside an electromagnetic wave for generating the first communication area and receives from the mobile device a response to the electromagnetic wave; a control device that determines, based on presence/absence of the response from the mobile device, whether the mobile device is present within the first communication area; and the mobile device capable of receiving the electromagnetic wave. Upon determination that the mobile device is present within the first communication area, the control device maintains transmitter power output of the electromagnetic wave to be transmitted from the communication section, the mobile device decreases sensitivity for receiving the electromagnetic wave so that the first communication area is narrowed to a second communication area smaller than the first communication area, and then, the control device determines, based on presence/absence of a response from the mobile device, whether the mobile device is present within the second communication area.

According to this first aspect, the mobile device decreases sensitivity for receiving the electromagnetic wave so that the first communication area is narrowed to the second communication area. Because the transmitter power output of the electromagnetic waves is maintained without being decreased, the receiving sensitivity of the mobile device is decreased with the transmitter power output of the electromagnetic wave fixed, and thus, a stretch or extent of the second communication area can be set with an increased accuracy.

The inventors of the present invention etc. have recognized that, if the transmitter power output of the electromagnetic wave is decreased with the receiving sensitivity of the mobile device fixed, the extent of the communication area to be narrowed would vary over an increased range.

According to a second aspect, upon determination that the mobile device is present within the first communication area, the communication section transmits a mode change signal to the mobile device, and the mobile device decreases the sensitivity in response to the mode change signal. According to this aspect, the control device determines that the mobile device is present within the first communication area set outside of the vehicle after closing of the door and then controls the communication section in order to execute an auto lock mode, so that the communication section can transmit the mode change signal to the mobile device. The mobile device can receive the mode change signal and decrease the receiving sensitivity in response to the mode change signal.

According to a third aspect, the mobile device decreases the sensitivity when transmitting the response to the communication section. According to this aspect, the mobile device can respond to the electromagnetic wave transmitted for generating the first communication area to be set outside of the vehicle immediately after closing of the door, and then the mobile device can decrease the receiving sensitivity of the mobile device. Because the mobile device is capable of decreasing the receiving sensitivity by itself or on its own, the mobile device can promptly decrease the receiving sensitivity and thereby promptly prepare the auto lock mode. In one preferred implementation, the mobile device may decrease the receiving sensitivity upon lapse of a predetermined time after having transmitted a response to the communication section According to a fourth aspect, the smart entry system further comprises a locking device that locks the door of the vehicle, and, upon determination that the mobile device is not present in the second communication area, the control device causes the locking device to lock the door of the vehicle. According to this aspect, the door of the vehicle is locked in response to the mobile device getting out of the second communication area. In other words, the smart entry system can execute the auto lock upon determination that the mobile device has got out of the vehicle.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIGS. 1A and 1B are views explanatory of communication areas of a smart entry system according to an embodiment of the present invention, of which FIG. 1A is explanatory of first communication areas set after doors are closed while FIG. 1B is explanatory of second communication areas narrowed from the first communication areas;

FIG. 2 is a diagram explanatory of reception characteristics of a mobile device in the smart entry system;

FIG. 3 is a block diagram showing an example overall setup of the embodiment of the smart entry system of FIG. 1.

DETAILED DESCRIPTION OF THE INVENTION

Figure 1B:
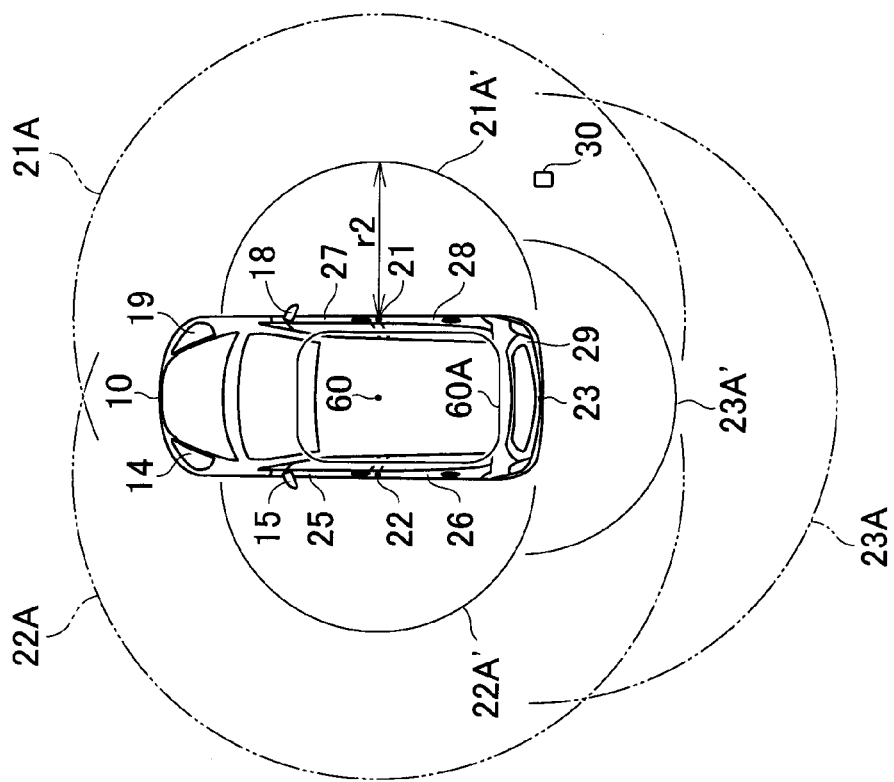
Figure 1A:
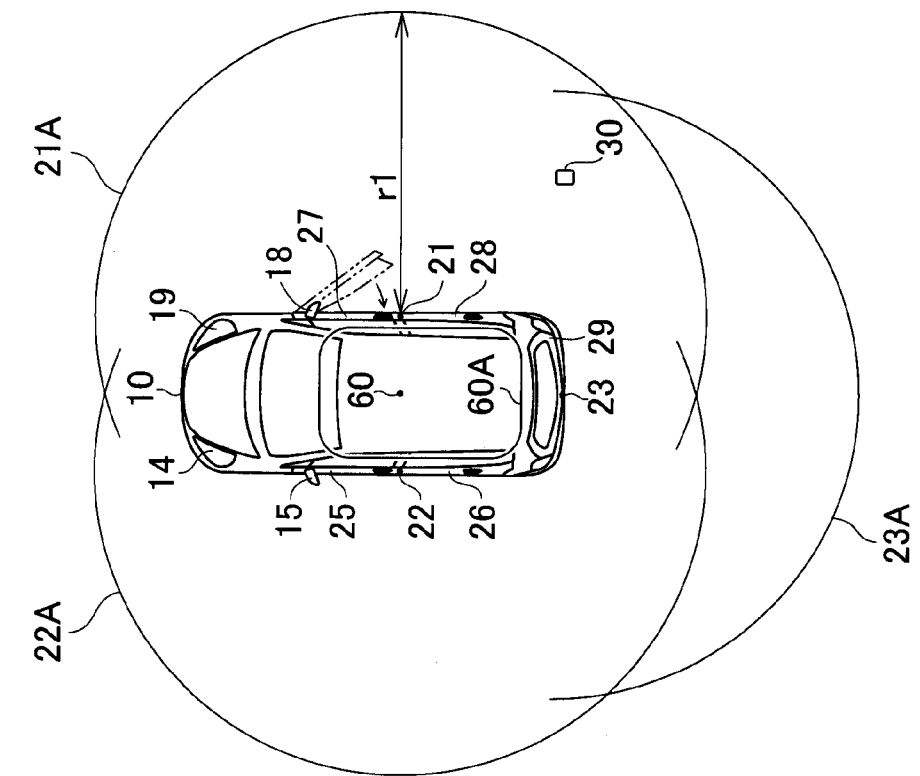

FIGS. 1A and 1B are views explanatory of communication areas of a smart entry system according to an embodiment of the present invention. As shown in FIG. 1A, such a communication area is set outside of a vehicle 10 that is, for example, a motor vehicle. The communication area shown in FIG. 1A is a first communication area (hereinafter sometimes referred to as "first overall communication area") that is set first immediately after a user or passenger gets out of the vehicle 10. The first communication area (external communication area) shown in FIG. 1A comprises a plurality of (e.g., three) first communication areas 21A, 22A and 23A (sub-areas). Also, at least one additional communication areas may be set inside of the vehicle 10, which includes one additional communication area (internal communication area) 60A. In the illustrated example of FIG. 1A, the plurality of (e.g., three) first communication areas 21A, 22A and 23A are set outside of the vehicle 10 while the one additional communication area (internal communication area) 60A is set inside of the vehicle 10 as a right front door 27 of the vehicle 10 depicted by two-dot-chain line is closed and consequently all doors 25, 26, 27, 28 and 29 of the vehicle 10 are closed.

In FIG. 1A, a mobile device 30 is present within the first communication area 21A (sub-area) of the three first communication areas 21A, 22A and 23A, so that the smart entry system can identify that the mobile device 30 has got out of the vehicle 10. The three first communication areas 21A, 22A and 23A (overall first communication area) are set such that the mobile device 30 is located within any one of the three first communication areas 21A, 22A and 23A even when the user having the mobile device 30 with it (i.e., her or him) ties to hurriedly move away from the vehicle 10. Transmitter power output of an electromagnetic wave to be transmitted, for example, from a first antenna 21 is set such that the mobile device 30 located outwardly away from the vehicle 10 by a distance of a predetermined value r1 (e.g., four meters (4 m)) can respond to the electromagnetic wave transmitted from the first antenna 21

In order to allow the mobile device 30, hurriedly getting away from the vehicle 10, to reliably respond to the electromagnetic wave, a greater stretch or extent of the plurality of (e.g., three) first communication areas 21A, 22A and 23A (first overall communication area) is more preferable. Note, however, that transmitter power output for setting each of the three first communication areas 21A, 22A and 23A (sub-areas) is set, for example, within a range prescribed by a predetermined law, such as the radio law. In other words, the transmitter power output of the electromagnetic wave to be transmitted, for example, from the first antenna 21 may be set at a maximum value allowed by the law.

Once it is identified that the mobile device 30 is present within any one of the plurality of (e.g., three) first communication areas 21A, 22A and 23A (i.e., within the first overall communication area) depicted by two-dot chain line in FIG. 1B, the three first communication areas 21A, 22A and 23A (first overall communication area) are narrowed to three second communication areas 21A', 22A' and 23A' (second overall communication area) depicted by solid line in FIG. 1B. In other words, in the instant embodiment, the transmitter power output for setting each of the plurality of (e.g., three) first communication areas 21A, 22A and 23A (sub-areas) is maintained and fixed, and thus, the three first communication areas 21A, 22A and 23A (first overall communication area) depicted by two-dot chain line in FIG. 1B are narrowed to three second communication areas 21A', 22A' and 23A' (second overall communication area) as depicted by solid line in FIG. 1B in response to decrease of receiving sensitivity of the mobile device 30.

In the illustrated example of FIG. 1B, although the mobile device 30 is present within the first overall communication area (i.e., any one of the three first communication areas 21A, 22A and 23A) depicted by two-dot chain line, it gets out of the second communication areas 21A', 22A' and 23A', depicted by solid line, as the receiving sensitivity of the mobile device 30 decreases. Thus, all of the doors 25 to 29 are locked simultaneously. Then, next time the mobile device 30 enters the second communication areas 21A', 22A' and 23A', all of the doors 25 to 29 are unlocked simultaneously.

FIG. 2 is a diagram explanatory of reception characteristics of the mobile device 30. In FIG. 2, the vertical axis represents distance of the mobile device 30 from the transmission antenna, for example, in centimeters (cm), while the horizontal axis represents reception performance of the mobile device 30, for example, in nanoteslas (nT). More specifically, the vertical axis can represent various distances between the mobile device 30 and, for example, the first antenna 21 for transmitting the electromagnetic wave that sets or generates one of the first communication areas (sub-areas). The horizontal axis can represent various reception performance of the mobile device 30 with which the mobile device 30 receives the electromagnetic wave transmitted from the first antenna 21. The reception performance corresponds to receiving sensitivity of the mobile device 30 or an intensity, such as an electric power level, of a received signal. According to the reception characteristics shown in FIG. 2, as the reception performance of the mobile device 30 gets worse, a communication distance between the mobile device 30 having that reception performance and the transmission antenna becomes shorter.

Further, according to the reception characteristics shown in FIG. 2, the distance between the mobile device 30 and the transmission antenna changes by a relatively great amount when the reception performance changes, for example, from s1 to s2, but the distance between the mobile device 30 and the transmission antenna changes by a smaller amount when the reception performance changes, for example, from s3 to s4. In other words, the reception performance of the mobile device 30 is stable over a range from s1 to s2 or on a low-sensitivity side. Therefore, in a case where the reception performance on the low-sensitivity side (e.g., s4) corresponds, for example, to a predetermined value r2 of the distance shown in FIG. 1B, such a predetermined value r2 (e.g., 2 m) can be set with an increased accuracy. Namely, although considerable individual differences (variations) in the reception performance tend to occur among various mobile devices 30 at the time of manufacturing of the mobile devices 30, variations in the predetermined value r2 (e.g., 2 m), resulting from such individual differences, can be minimized.

On the other hand, in a case where the reception performance on a high-sensitivity side (e.g., s2) corresponds, for example, to the predetermined value r1 of the distance shown in FIG. 1A, variations in the predetermined value r1 are great. However, because the communication distance between the mobile device 30 having high-sensitivity-side reception performance and the transmission antenna is great, the mobile device 30 would be present, for example, within the first communication area 21A (sub-area) even when the user having the mobile device 30 with it tries to hurriedly move away from the vehicle 10.

In the illustrated example of FIG. 2, the reception performance and the intensity of the received signal corresponding to the distance of 4 m (=400 cm) are s2 (nT) and TH1 (W), respectively, and the reception performance and the intensity of the received signal corresponding to the distance of 2 m (=200 cm) are s4 (nT) and TH2 (W), respectively, For example, in the case where the transmitter power output of the electromagnetic wave to be transmitted from the first antenna 21 is set or fixed at a maximum value allowed by the low and when the intensity of the received signal in the mobile device 30 is TH1 or over, the mobile device 30 can respond to that received signal (electromagnetic wave). For example, when the mobile device 30 is present within the first communication area 21A set at the distance of 4 m, the mobile device 30 can respond to the electromagnetic wave transmitted from the first antenna 21 and generating the first communication area 21A.

The mobile device 30 shown in FIG. 1A has first sensitivity for receiving electromagnetic waves, while mobile device 30 shown in FIG. 1B has second sensitivity for receiving electromagnetic waves. When, after the first sensitivity has decreased to the second sensitivity, the intensity of a received signal in the mobile device 30 having the second sensitivity is, for example, TH2 or over, the mobile device 30 having the second sensitivity can respond to the received signal (electromagnetic wave); in other words, when the mobile device 30 having the second sensitivity is present within the second communication area 21A' set at the predetermined value r2 (e.g., 2 m), the mobile device 30 can respond to the electromagnetic wave transmitted from the first antenna 21 and generating the second communication area 21A'.

Namely, because the receiving sensitivity of the mobile device 30 is decreased with the transmitter power output of the electromagnetic wave to be transmitted from the first antenna 21 fixed, the first communication area 21A (sub-area), for example, is narrowed to the second communication area 21A' (sub-area). Similarly, the other first communication areas 22A and 23A too are narrowed to the second communication areas 22A' and 23A'.

Note that, if the electromagnetic wave to be transmitted from the first antenna 21 is decreased with the receiving sensitivity of a mobile device (i.e., comparative example) fixed or with the high-sensitivity-side reception performance (e.g., s2) of FIG. 2 fixed, great variations would occur for a communication area that is set, for example, at the 2-m distance (i.e., a communication area having the same stretch or extent as the second communication 21A').

The inventors of the present invention etc. have recognized that, with the conventionally-known approach (i.e., comparative example) of reducing, in order to narrow for example the first communication area 21A (sub-area) of FIG. 1A, the transmitter power output of the electromagnetic wave generating the first communication area 21A, accuracy in setting a narrowed communication area (i.e., a communication area having the same extent as the second communication area 21A') would undesirably decrease.

FIG. 3 is a block diagram showing an example overall setup of the embodiment of the smart entry system 100 of FIG. 1. As shown in FIG. 3, the smart entry system 100 comprises, for example, a communication section 24 and a control device 20. The communication section 24 shown in FIG. 3 transmits, with a first cyclic period, first electromagnetic waves, generating the first communication areas 21A, 22A and 23A, to outside of the vehicle 10, and it is capable of receiving from the mobile device 30 a response to any one of the first electromagnetic waves. Further, the control device 20 of FIG. 3 determines, on the basis of presence/absence of a response from the mobile device 30, whether the mobile device 30 is present within the first overall communication area. Namely, the smart entry system 100 is capable of detecting whether the mobile device 30 is present within any one of the first communication areas 21A, 22A and 23A set outside of the vehicle 10.

The smart entry system 100 further includes the mobile device 30 of FIG. 3, a door opening/closing detection section 11 and a lock/unlock section 12. A device provided in the lock/unlock section 12 and having or performing at least a lock function of the lock/unlock section 12 can be referred to as a "locking device", a device provided in the lock/unlock section 12 and having at least an unlock function of the lock/unlock section 12 can be referred to as an "unlocking device", and a device provided in the lock/unlock section 12 and having both of the lock and unlock functions of the lock/unlock section 12 can be referred to as a "locking/unlocking device". The mobile device 30 of FIG. 3 is capable of receiving an electromagnetic wave transmitted from the communication section 24, for example, with a first cyclic period and transmitting a response to the received electromagnetic wave. The door opening/closing detection section 11 is capable of detecting opening and closing of each of the doors 25, 26, 27, 28 and 29. When at least one, preferably all, of the doors 25, 26, 27, 28 and 29 has been closed, the door opening/closing detection section 11 can output an enable signal to the control device 20. In response to receipt of such an enable signal, the control device 20 controls the communication section 24 to transmit, to outside of the vehicle 10, electromagnetic waves that generate, for example, the first communication areas 21A, 22A and 23A shown in FIG. 1A.

Also, in response to receipt of the enable signal, the control device 20 may control the communication section 24 to transmit, to inside of the vehicle 10, an additional electromagnetic wave that generates, for example, the one additional communication area 60A shown in FIG. 1A when transmitting, to outside of the vehicle 10, the electromagnetic waves that generate, for example, the first communication areas 21A, 22A and 23A shown in FIG. 1A as noted above.

Then, the communication section 24 of FIG. 3 transmits, to outside of the vehicle 10, electromagnetic waves that generate the narrowed or second communication areas 21A', 22A' and 23A' shown in FIG. 1B, for example, with the first cyclic period. Namely, the mobile device 30 decreases the first sensitivity for receiving electromagnetic waves to the second sensitivity, and the control device 20 determines, on the basis of presence/absence of a response from the mobile device 30 having the second sensitivity, whether the mobile device 30 is present within the second overall communication area.

Once the mobile device 30 having the second sensitivity gets out of the second communication areas 21A', 22A' and 23A' so that no more response is received from the mobile device 30 having the second sensitivity (namely, when the status of the response from the mobile device 30 is "absent"), the lock/unlock section 12 can lock at least one, preferably all, of the doors 25, 26, 27, 28 and 29.

After that, once the mobile device 30 having the second sensitivity enters the second communication areas 21A', 22A' and 23A', i.e. when the status of the response from the mobile device 30 changes from "absent" to "present", the lock/unlock section 12 can unlock at least one, preferably all of, the locked doors 25, 26, 27, 28 and 29.

Note that the response from the mobile device 30 may have the intensity of the electromagnetic wave received by the mobile device 30. For example, when the intensity of the received electromagnetic wave is equal to or greater than a predetermined value greater than TH2, i.e. when the user having with it (her or him) the mobile device 30 having the second sensitivity further approaches the vehicle 10 after the mobile device 30 having the second sensitivity has entered the second communication areas 21A', 22A' and 23A', the lock/unlock section 12 may unlock all of the locked doors 25, 26, 27, 28 and 29.

The smart entry system 100 of FIG. 3 may further comprise operation sections (not shown) provided, for example, on or in knobs of the doors 25 to 29. The lock/unlock section 12 may unlock all of the locked doors 25 to 29 in response to the mobile device 30 entering the second communication areas 21A', 22A', 23A' and then the user touching at least one of the knobs of the doors 25 to 29.

The control device 20 of FIG. 3 is an electronic control unit (ECU) implemented, for example, by a microcomputer, and the control device 20 has a processing section that determines, on the basis of presence/absence of a response from the mobile device 30, whether or not the mobile device 30 is present within any one of the communication areas, such as the first, second and additional communication areas. The control device 20 also has a storage section prestoring therein, as an initial or default value, of transmitter power output of the electromagnetic wave for generating the first communication area (or the second communication area). The storage section of the control device 20 may prestore transmitter power output of the additional electromagnetic wave for generating the additional communication area. The control device 20 can control the communication section 24 so that the electromagnetic waves (preferably including the additional electromagnetic wave) are transmitted, for example with the first cyclic period, from the communication section 24 with the prestored transmitter power output. The storage section of the control device 20 can also store therein unique ID information of the smart entry system 100 or vehicle 10, and the control device 20 can include such unique ID information in both the electromagnetic wave (request signal) and the additional electromagnetic wave (request signal).

The storage section of the control device 20 may further store therein, for example, three antenna ID information identifying the first, second and third antennas 21, 22 and 23 of the communication section 24. The control device 20 can include, in each of the first electromagnetic waves (request signals) to be transmitted from the first and second and third antennas 21, 22 and 23, both the unique ID information and the above-mentioned antenna ID information corresponding to one of the first, second and third the antennas.

Similarly, the storage section of the control device 20 may further store therein, for example, one additional antenna ID information identifying a fourth antenna 60 of the communication section 24. The control device 20 can include, in the additional electromagnetic wave (request signal) to be transmitted from the fourth antenna 60, both the unique ID information and the one antenna ID information corresponding to the fourth antenna.

The communication section 24 of FIG. 3 has communication antennas which include, for example, the first to third and fourth antennas (transmission antennas) 21 to 23 and 60 as well as a not-shown reception antenna. Moreover, the communication section 24 may further include a transmission device 41 comprising, for example, an oscillator, a modulator and an amplifier. Note, however, that at least one of the oscillator, modulator and amplifier (i.e., a part or whole of the transmission device 41) may be provided in the control device 20.

The oscillator of the communication section 24 generates a signal that serves as a source of the frequency (transmission frequency) of each of the electromagnetic waves transmitted from the first, second, third and fourth antennas (transmission antennas) 21, 22, 23 and 60. Note that the "transmission frequency" is, for example, a low frequency. Further, the modulator of the communication section 24 modulates the signal from the oscillator with the request signal given from the control device 20 so that the request signal can be included in the electromagnetic waves (including the additional electromagnetic wave). The amplifier of the communication section 24 amplifies the signal from the modulator up to necessary electric power and then outputs the thus-amplified signal to the first, second, third and fourth antennas (transmission antennas) 21, 22, 23 and 60. Note that the control device 20 can determine first transmitter power output of the electromagnetic waves (including the additional electromagnetic wave), for example, by controlling an amplification factor of the amplifier.

The mobile device 30 of FIG. 3 is, for example, in the form of a key fob (FOB) comprising an FPGA and a communication device, and the mobile device 30 has a processing section that generates a response to the electromagnetic waves (including the additional electromagnetic wave) sent from the control device 20 or the communication section 24. The storage section of the mobile device 30 can store therein the unique ID information of the smart entry system 100 or the vehicle 10, and the mobile device 30 can include such unique ID information in a response (acknowledge signal) to be returned in response to the electromagnetic waves (request signals) and the additional electromagnetic wave (request signal).

When unique ID information is included in the request signal, the processing section of the mobile device 30 determines whether the unique ID information included in the request signal matches the unique ID information stored in the storage section of the mobile device 30. If the unique ID information included in the request signal matches the unique ID information stored in the storage section of the mobile device 30, the mobile device 30 can transmit a response (acknowledge signal).

Further, the mobile device 30 of FIG. 3 can have a communication section having, for example, communication antennas, and the communication antennas may include a reception antenna and a transmission antenna (not shown). The communication section of the mobile device 30 may further include, for example, a receiver 32 that comprises a tuner, an amplifier and a demodulator (not shown), and a transmitter comprising an oscillator, a modulator and an amplifier (not shown). Note however, that at least one of the not-shown tuner, amplifier and demodulator of the receiver (i.e., a part or whole of the receiver 32) and/or at least one of the not-shown oscillator, modulator and amplifier of the transmitter (i.e., a part or whole of the transmitter) may be provided in the processing section of the mobile device 30.

The tuner of the receiver 32 of the mobile device 30 is connected to the reception antenna, and the tuner can extract a transmission frequency component of any one of the electromagnetic waves (including the additional electromagnetic wave) received via the reception antenna, and reduce or remove noise included in the received electromagnetic wave. The amplifier of the receiver 32 of the mobile device 30 amplifies the signal received from the tuner, and the demodulator of the receiver 32 of the mobile device 30 demodulates the amplified signal. Thus, the processing section of the mobile device 30 can recognize the request signal included in each of the received electromagnetic waves (including the additional electromagnetic wave). Then, the processing section of the mobile device 30 authenticates the unique ID information and generates an acknowledge signal (response), after which the processing section can transmit the acknowledge signal (response) via the transmitter and the transmission antenna of the mobile device 30.

In order to set the first communication areas 21A, 22A and 23A outside of the vehicle 10 (as depicted by solid line in FIG. 1A or two-dot chain line in FIG. 1A), the mobile device 30 can generate and transmit an acknowledge signal (response) when the intensity of an electromagnetic wave received by the reception antenna of the receiver 32 of the mobile device 30 (in the high sensitivity mode) is, for example, TH1 or over.

On the other hand, in order to set the narrowed or second communication areas 21A', 22A' and 23A' outside the vehicle 10 (as depicted by solid line in FIG. 1B), the mobile device 30 can generate and transmit an acknowledge signal (response) when the intensity of an electromagnetic wave received by the reception antenna of the receiver 32 of the mobile device 30 (in the low sensitivity mode) is, for example, TH2 or over.

Further, in order to set the additional communication area 60A inside of the vehicle 10 (as shown for example in FIG. 1A), the receiver 32 of the mobile device 30 is set, for example, in the low sensitivity mode. Namely, the mobile device 30 can generate and transmit an acknowledge signal (response) when the intensity of an electromagnetic wave received by the reception antenna of the receiver 32 of the mobile device 30 (in the low sensitivity mode) is, for example, TH2 or over. Stated differently, transmitter power output of the additional electromagnetic wave is set such that the receiver 32 of the mobile device 30 set in the low sensitivity mode can respond to the additional electromagnetic wave within the additional communication area 60A.

Needless to say, in order to set the additional communication area 60A inside of the vehicle 10 (as shown for example in FIG. 1A), the receiver 32 of the mobile device 30 may be set in the high sensitivity mode. Stated differently, transmitter power output of the additional electromagnetic wave is set such that the receiver 32 of the mobile device 30 set in the high sensitivity mode can respond to the additional electromagnetic wave within the additional communication area 60A.

The oscillator of the transmitter of the mobile device 30 generates a signal that serves as a source of a frequency (transmission frequency) of an electromagnetic wave (acknowledge signal) forming a response to be returned via the transmission antenna of the transmitter of the mobile device 30. Here, the transmission frequency of the oscillator of the transmitter of the mobile device 30 is, for example, an RF frequency (Radio Frequency) or UHF frequency (Ultra High Frequency).

The processing section of the mobile device 30 can include, in the electromagnetic wave (acknowledge signal) to be transmitted via the transmission antenna of the transmitter of the mobile device 30, not only the unique ID information but also at least one of the three antennal ID information and reception intensity information indicative of reception intensity, in the mobile device 30, corresponding to the at least one of the three antennal information.

The communication section 24 of FIG. 3 may further include a receiver that comprises a tuner, an amplifier and a demodulator. Note, however, that at least one of the tuner, amplifier and demodulator (i.e., a part or whole of the receiver) may be provided in the control device 20.

When the control device 20 has received the response (acknowledge signal) from the mobile device 30, it determines that the mobile device 30 is present within any one of the first communication areas 21A, 22A, 23A (i.e, within the first overall communication areas) or the additional communication area 60A. If the acknowledge signal includes the unique ID information, the processing section of the control device 20 can determine whether the mobile device 30 is present within any one of the first communication areas 21A, 22A, 23A (i.e, within the first overall communication area) or the additional communication area 60A, after authenticating the unique ID information included in the acknowledge signal. Further, if the acknowledge signal includes at least one antenna ID information, then the processing section of the control device 20 can identify a particular sub-area(s) of the first overall communication area 21A, 22A, 23A, such as the first transmission sub-area 21A set to the right of the vehicle 10. Note, when the at least one antenna ID information is a plurality of antenna ID information, then a position of the mobile device 30 may be identified or estimated taking into account a plurality of reception intensity information corresponding to the plurality of antenna ID information.

Figure 4:
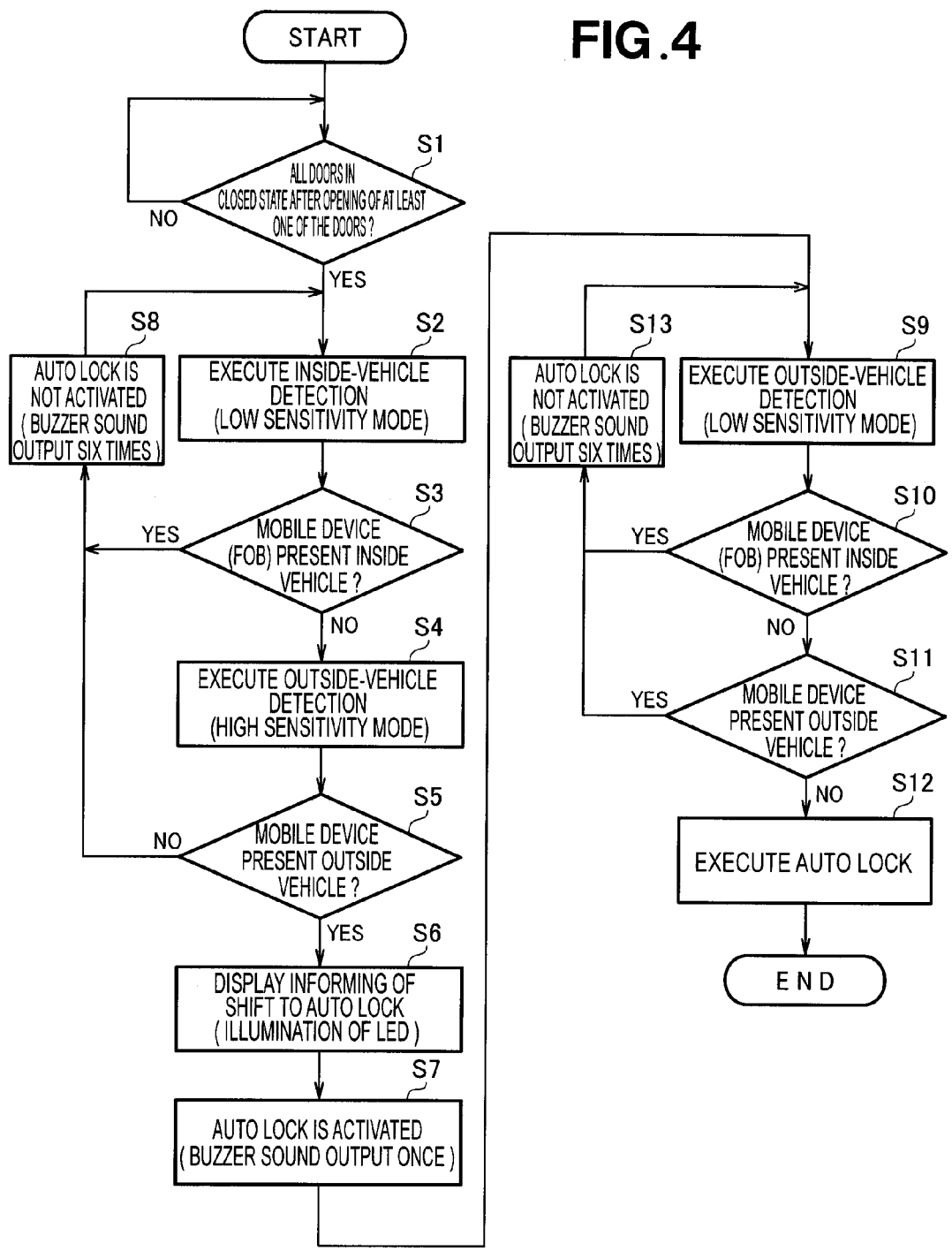
FIG. 4 is a flow chart showing example behavior of the smart entry system of FIG. 3.

FIG. 4 is a flow chart showing example behavior of the smart entry system 100. In FIG. 4, "START" indicates a time point when a drive section (not shown), such as an engine, of the vehicle 10 has been turned off. Note that the mobile device 30 is normally set in the low sensitivity mode.

For example, the processing section of the control device 20 of FIG. 3 inputs respective states of the doors 25, 26, 27, 28 and 29 from the door opening/closing section 11. The processing section of the control device 20 determines whether the door opening/closing section 11 has detected a change from the closed state to the opened state (i.e., first change) of at least one of the four doors 25, 26, 27 and 28 opened by the user in order to get out of the vehicle 10. Then, the processing section of the control device 20 determines whether the door opening/closing section 11 has detected a change from the opened state to the closed state (i.e., second change) of the at least one of the four doors 25, 26, 27 and 28. In this way, the processing section of the control device 20 can determine whether the user has got out of the vehicle 10.

Once the user opens at least one of the four doors 25, 26, 27 and 28 in order to get out of the vehicle 10 and then closes the at least one of the four doors 25, 26, 27 and 28, i.e. once the door opening/closing section 11 detects a change from the opened state to the closed state (i.e., second change) of the at least one of the four doors 25, 26, 27 and 28, the processing section of the control device 20 determines whether all of the four doors 25, 26, 27 and 28 (preferably, the door 29 as well) are currently in the closed state.

For example, the user seated, for example, in a driver's seat opens the door 27 and then closes the door 27 as the user gets out of the vehicle 10. If no user is present in any one of the seats including the driver's seat when the user gets out of the vehicle 10, all of the four doors 25, 26, 27 and 28 corresponding to all of the seats are closed. However, if another user is seated, for example, in an assistant driver's seat when the user seated in the driver's seat gets out of the vehicle 10, then the door 25 corresponding to the assistant driver's seat is opened by the other user and then closed as the other user gets out of the vehicle 10. Thus, when the door 27 is closed with the door 25 left in the opened state, for example, the processing section of the control device 20 waits until the door 25 is closed (step S1 of FIG. 4).

For example, when all of the four doors 25, 26, 27 and 28 (preferably, the door 29 as well) have been closed, the smart entry system 100 can execute an inside-vehicle detection mode at step S2 of FIG. 4. Note, however, that the smart entry system 100 may omit execution of the inside-vehicle detection mode.

More specifically, at step S2 of FIG. 4, the mobile device 30 executes the inside-vehicle detection mode, for example, in the low sensitivity mode. The processing section of the control device 20 of FIG. 3 reads out the transmitter power output stored as an initial or default value in the storage section of the control device 20, and then, the processing section of the control device 20 sets the amplifier factor of the amplifier of the transmitter 41 of the communication section 24 so that the additional electromagnetic wave transmitted from the fourth antenna (transmission antenna) 60 has that transmitter power output.

Further, at step S3 of FIG. 4, the processing section of the control device 20 of FIG. 3 determines whether the mobile device 30 is present in the additional communication area 60A set inside of the vehicle 10. If the mobile device 30 is present in the additional communication area 60A as determined at step S3, the smart entry system 100 can execute outside-vehicle detection at step S4 of FIG. 4. Specifically, at step S4, the processing section of the control device 20 of FIG. 3 controls the transmitter 41 of the communication section 24 in such a manner that electromagnetic waves having, for example, maximum transmitter power output can be output from each of the first, second and third antennas (transmission antennas) 21, 22 and 23.

The processing section of the control device 20 of FIG. 3 can not only set the additional communication area 60A inside of the vehicle 10, but also simultaneously set the first communication areas 21A, 22A and 23A outside of the vehicle 10. When it has been determined that the mobile device 30 is present within the additional communication area 60A, the control device 20 can include a mode change signal in the electromagnetic wave (request signal). Upon receipt of the mode change signal, the mobile device 30 changes the second sensitivity of the receiver 32 of the mobile device 30 to the first sensitivity, at step S4. In this manner, the mobile device 30 is set in the high sensitivity mode.

Alternatively, the communication section 24 may be arranged to not transmit the mode change signal when it has been determined, at step S3 of FIG. 4, that the mobile device 30 is present within the additional communication area 60A, the communication section 24 need not necessarily transmit the mode change signal. Namely, the mobile device 30 set in the low sensitivity mode or having the second sensitivity may increase the second sensitivity to the first sensitivity at step S4 after having responded to the additional electromagnetic wave transmitted from the fourth antenna 60. In this manner, the mobile device 30 of FIG. 3 is set in the high sensitivity mode. Note that the mobile device 30 may increase the second sensitivity to the first sensitivity upon lapse of a predetermined time after having transmitted a response to the communication section 24.

At step S5 of FIG. 4, the processing section of the control device 20 of FIG. 3 determines whether the mobile device 30 is present within any one of the first communication areas 21A, 22A and 23A (within the first overall communication area) set outside of the vehicle 10. If the mobile device 30 is present within any one of the first communication areas 21A, 22A and 23A as determined at step S5, the smart entry system 100 can identify that the mobile device 30 has got out of the vehicle 10. The three first communication areas 21A, 22A and 23A (overall first communication area) are set such that the mobile device 30 is located within any one of the three first communication areas 21A, 22A and 23A even when the user having the mobile device 30 with it (i.e., her or him) tries to hurriedly move away from the vehicle 10. Transmitter power output of the electromagnetic wave to be transmitted, for example, from the first antenna 21 is set such that the mobile device 30 located outwardly away from the vehicle 10 by the predetermined value r1 (e.g., 4 m) or less can respond to the electromagnetic wave transmitted from the first antenna 21.

Further, at step S5 of FIG. 4, the smart entry system 100 can activate the mode when the mobile device 30 is present within any one of the first communication areas 21A, 22A and 23A (i.e., within the first overall communication area) set outside of the vehicle 10 (steps S6 and S7). But, the smart entry system 100 does not activate the auto lock mode when the mobile device 30 is not present within any one of the first communication areas 21A, 22A and 23A set outside of the vehicle 10 (at step S8). Note that, when the mobile device 30 is present within the additional communication area 60A set inside of the vehicle 10, the smart entry system 100 does not activate the auto lock mode (step S8).

At step S6 of FIG. 4, the smart entry system 100 can inform the user that the system 100 has shifted to the auto lock mode. The smart entry system 100 of FIG. 3 may further include a notification section 70 that includes, among other things, blinkers or direction indicators. The processing section of the control device 20 of FIG. 3 can illuminate such direction indicators. Note that blinking mechanisms, such as the direction indicators, can be provided, for example, on headlight sections 14 and 19, door mirror sections 15 and 18 and taillight sections 16 and 17 of the vehicle 10 of FIG. 1.

At step S7 of FIG. 4, the smart entry system 100 can inform the user that the auto lock mode has been activated. The notification section 70 of FIG. 3 includes, for example, a buzzer. The processing section of the control device 20 of FIG. 3 can cause the buzzer to output buzzer sound for example only once, in order to inform the user that the auto lock mode has been activated. Further, at step S8 of FIG. 4, the smart entry system 100 can inform the user that it does not activate the auto lock mode. The processing section of the control device 20 of FIG. 3 can cause the buzzer to output buzzer sound for example only six times, in order to inform the user that it does not activate the auto lock mode.

At step S9 of FIG. 4, the smart entry system 100 can execute the outside-vehicle detection mode. At steps S10 and S11 of FIG. 4, the mobile device 30 of FIG. 3 has been previously set, for example, in the low sensitivity mode. At step S10 of FIG. 4, the processing section of the control device 20 of FIG. 3 determines whether the mobile device 30 is present within the additional communication area 60A set inside of the vehicle 10. At step S11, the processing section of the control device 20 of FIG. 3 determines whether the mobile device 30 is present within any one of the narrowed or second communication areas 21A', 22A' and 23A' (i.e., within the second communication area) set outside of the vehicle 10.

If the mobile device 30 is present within any one of the narrowed or second communication areas 21A', 22A' and 23A' (i.e., within the second communication area) as determined at step S11 of FIG. 4, i.e. if the mobile device 30 having the second sensitivity is present within any one of the narrowed or second communication areas 21A', 22A' and 23A' set at the predetermined value r2 (e.g., 2 m) (see FIG. 1B), the smart entry system 100 can inform the user that the auto lock mode is not executed (step S13). For that purpose, the processing section of the control device 20 of FIG. 3 can cause the buzzer to output buzzer sound for example only six times (step S13).

Further, if the mobile device 30 having the second sensitivity is not present within any one of the narrowed or second communication areas 21A', 22A' and 23A' (i.e., within the second overall communication area) as determined at step S11 of FIG. 4, the processing section of the control device 20 of FIG. 3 can control the lock/unlock section 12 to simultaneously unlock all of the doors 25, 26, 27, 28 and 29 (step S13).

At step S9 of FIG. 4, the mobile device 30 decreases the first sensitivity for receiving electromagnetic waves to the second sensitivity, so that the first communication areas 21A, 22A and 23A is narrowed to the second communication areas 21A', 22A' and 23A'. At that time, the transmitter power output of the electromagnetic waves is maintained without being decreased. Namely, the receiving sensitivity of the mobile device 30 is decreased with the transmitter power output of the electromagnetic waves fixed, and thus, an extent, which is for example 2 m corresponding to the predetermined value r2, of the second communication areas 21A', 22A' and 23A' to be narrowed from the first communication areas 21A, 22A and 23A can be set with an increased accuracy.

Further, if the mobile device 30 is present within any one of the first communication areas 21A, 22A and 23A (i.e., within the first overall communication area) set outside of the vehicle 10 as determined at step S5 of FIG. 4, the communication section 24 transmits a mode change signal to the mobile device 30. The mobile device 30 may decrease the first sensitivity to the second sensitivity in response to the mode change signal, at step S9 of FIG. 4. Alternatively, the mobile device 30 may decrease the first sensitivity to the second sensitivity when responding to the electromagnetic waves generating the first communication areas 21A, 22A and 23A set outside of the vehicle 10, i.e. when transmitting the response to the communication section 24. Because the mobile device 30 is capable of decreasing the receiving sensitivity by itself, the mobile device 30 can promptly decrease the receiving sensitivity and thereby promptly prepare the auto lock mode. Furthermore, in this case, the communication section 24 does not have to generate the mode change signal and hence does not have to transmit the mode change signal to the mobile device 30. Note that the mobile device 30 may decrease the first sensitivity to the second sensitivity upon lapse of a predetermined time after having transmitted a response to the communication section 24.

Finally, it should be appreciated that the present invention is not limited to the above-described embodiments and that various modifications thereof are also possible without departing from the spirit so as to cover the scope recited in the appended claims.

What is claimed is:

1. A smart entry system which detects whether or not a mobile device is present within a first communication area set outside of a vehicle, the smart entry system comprising:
   a door opening/closing section that detects opening and closing of a door of the vehicle;
   a communication section that, once a change from an opened state to a closed state of the door is detected by the door opening/closing section, transmits to the outside an electromagnetic wave for generating the first communication area and receives from the mobile device a response to the electromagnetic wave;
   a control device that determines, based on presence/absence of the response from the mobile device, whether the mobile device is present within the first communication area; and
   the mobile device capable of receiving the electromagnetic wave and transmitting the response to the electromagnetic wave,
   wherein, upon determination that the mobile device is present within the first communication area,
      the control device maintains transmitter power output of the electromagnetic wave to be transmitted from the communication section,
      the mobile device decreases sensitivity for receiving the electromagnetic wave so that the first communication area is narrowed to a second communication area smaller than the first communication area, and
      then, the control device determines, based on presence/absence of the response from the mobile device, whether the mobile device is present within the second communication area, and
   wherein the mobile device decreases the sensitivity when transmitting to the communication section the response to the electromagnetic wave that generates the first communication area.

2. The smart entry system according to claim 1, which further comprises a locking device that locks the door of the vehicle, and wherein, upon determination that the mobile device is not present in the second communication area, the control device causes the locking device to lock the door of the vehicle.

* * * * *